United States Patent [19]

Totsu

[11] 4,203,057
[45] May 13, 1980

[54] CONTROL MEANS FOR THE WIRE WRAPPING MACHINE

[76] Inventor: Katsuyuki Totsu, No. 4-7, 3-chome, Oshiage, Sumida-ku, Tokyo, Japan

[21] Appl. No.: 958,557

[22] Filed: Nov. 7, 1978

Related U.S. Application Data

[63] Continuation of Ser. No. 737,078, Nov. 1, 1976, abandoned.

[30] Foreign Application Priority Data

Dec. 6, 1975 [JP] Japan .................. 50-145380

[51] Int. Cl.$^2$ .................................................. H02P 3/10
[52] U.S. Cl. .................................... 318/285; 318/286; 318/293; 318/265
[58] Field of Search ............... 318/265, 266, 267, 282, 318/283, 284, 285, 286, 291, 292, 293, 294, 296, 297, 300

[56] References Cited

U.S. PATENT DOCUMENTS

| | | | |
|---|---|---|---|
| 2,571,197 | 10/1951 | Buss | 318/265 |
| 2,576,518 | 11/1951 | Knauth | 318/293 |
| 2,753,502 | 7/1956 | Kylin | 318/265 |
| 3,248,629 | 4/1966 | Reynolds | 318/283 |
| 3,532,952 | 10/1970 | Cagnon | 318/266 |
| 3,588,652 | 10/1969 | Lewis | 318/286 |

*Primary Examiner*—J. V. Truhe
*Assistant Examiner*—William L. Feeney

[57] ABSTRACT

A control means for the wire wrapping machine comprising a lead wire wrapping spindle and an outer fixed sleeve for rotatably supporting the spindle in which after completion of the wire wrapping operation an inverse current is supplied to a motor for the short period to allow the spindle to rotate reversely so that a slot provided in the spindle always comes to a position in alignment with a recess provided in the outer sleeve.

7 Claims, 5 Drawing Figures

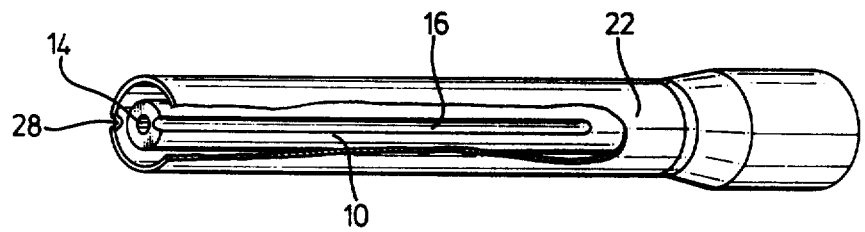
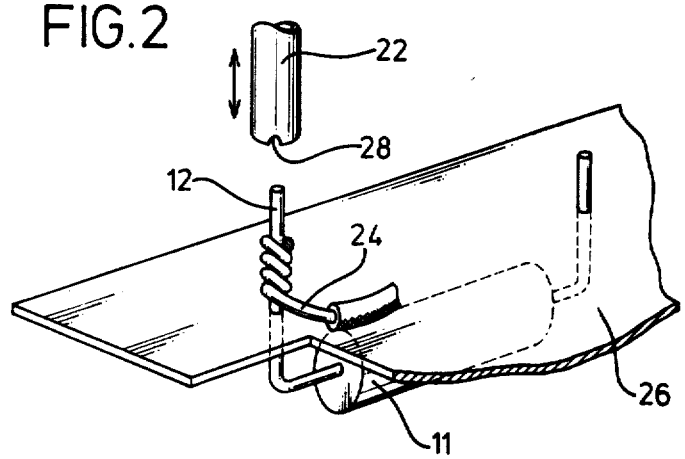
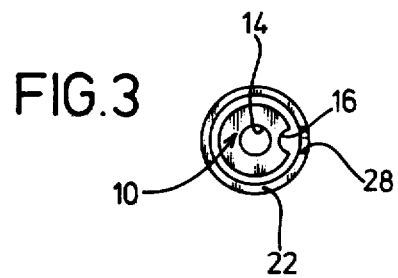
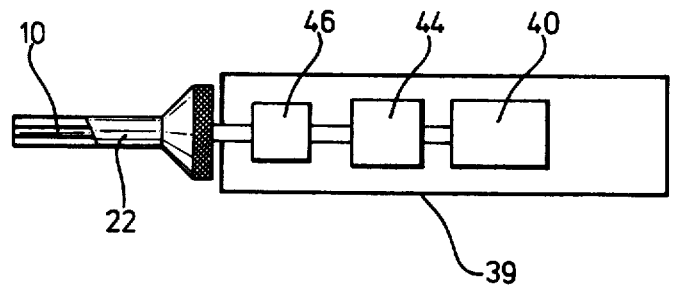

CONTROL MEANS FOR THE WIRE WRAPPING MACHINE

This is a continuation of Ser. No. 737,078, filed Nov. 1, 1976, now abandoned.

BACKGROUND OF THE INVENTION

This invention relates to an improved wire wrapping machine and more particularly to a control means for a wire wrapping machine which is so constructed that a spindle for wrapping a lead wire of the wire wrapping machine is automatically and reversely rotted to stop at the fixed position in relation to a sleeve supporting the spindle therein.

Recently, in order to save the assembly works of the electronic circuit parts, a so-called "wire wrapping" is generally used in which a stripped portion of the lead wire is wrapped tightly without soldering around a metal terminal, which is protruded from the base circuit plate, of a circuit element such as electrolytic condenser or resistor.

A working instrument for effecting the wire wrapping operation is generally called as a wire wrapping machine which comprises a lead wire wrapping spindle rotatable by a driving power source of an electric motor or an air motor and an outer sheath sleeve for supporting rotatably the spindle therein. The spindle 10, as is shown in FIG. 1, is provided at its center with a hole 14 of a predetermined depth for receiving a bar terminal 12 of a circuit element 11 and formed longitudinally with a slot 16 on its periphery for holding the lead wire. This spindle 10 is connected through a clutch means as hereinafter described to the motor accommodated in the wrapping machine. The spindle 10 is contained in an outer sleeve 22 having a somewhat larger inner diameter than that of the spindle and being fixed to the machine.

In the wrapping operation of the lead wire, the stripped portion of the lead wire 24 such as the vinyl wrapped copper wire is inserted into the slot 16, on this step since the spindle 10 is enclosed in the fixed sleeve 22, the lead wire 24 is held by the slot 16 and an inner circumferential wall of the sleeve 22 without slipping out, then the bar terminal 12 of the circuit element 11 protruding vertically from the circuit base plate 26 is vertically inserted into the central hole 14 of the spindle 10 which is in turn constrained to rotate for the predetermined period by holding the wrapping machine so that the stripped portion of the lead wire 24 is tightly wrapped around the bar terminal 12 as shown in FIG. 2 to obtain a complete conductive connection. At the open end of the sleeve 22 there is provided a recess 28 for enabling the wrapping of the lead wire from the base of the bar terminal. To achieve a rapid and continuous wrapping of the lead wire the necessity arises of providing a mechanism in which the spindle 10 when the motor is stopped is returned to a specified position in the sleeve 22 to align an open end of the slot 16 with the recess 28 as shown in FIG. 3.

For this purpose, in the conventional wrapping machine a ratchet mechanism (not shown) is incorporated so that when the operation of the spindle 10 is stopped after completion of wrapping of the lead wire 24 the spindle 10 is turned reversely under the function of the spring for engagement with the ratchet to stay stationarily at the specific position in the sleeve 22. Since, however, the return elasticity of the spindle when stopped is not sufficient enough and the spindle in a direct connection with the motor receives an excessive load and accordingly the reverse rotation by the elasticity can not be obtained. To resolve this problem, in the conventional wrapping machine a clutch means is arranged between the spindle and the motor driving shaft to release the connection therebetween for decreasing the resistance load against the spindle. However, inevitable use of the clutch means will result in increasment of the weight of the machine per se and the cost for manufacturing the machine. Furthermore, when the ac motor is used as a power source, there are such disadvantages that the change of rotation is difficult with much noise while when a compressed air is applied as a power source, a high exhaust noise is caused with use of a separate compressor.

After intensive studies of the above problem, the inventor has employed a dc motor which is conveniently reversible by merely changing the polarity to apply an inverse voltage thereto for a short period after cessation of the motor with completion of the wire wrapping thereby to turn the motor reversely. The reversely rotating spindle is enganed with a ratchet to stop at a determined position in relation to the outer sleeve. By this arrangement, the clutch means used in the conventional machine to release a connection between the spindle and the motor becomes unnecessary.

As a substantial manner for applying an inverse voltage to the motor for a short period, provision is made of a control means in which a first rectifying circuit and a second rectifying circuit are arranged and the dc motor is connected to the first rectifying circuit and a chargeable and dischargeable condensor of the great capacity is connected to a motor circuit in parallel so that the condenser is charged during the working operation of the motor and after completion of the wire wrapping operation the current supply from the first rectifying circuit to the motor is interrupted to shortcircuit the motor energizing circuit for passing a short current therethrough to interrupt the operation of the motor while commencing discharge of the condenser so that the discharge voltage energized a relay through an amplifying circuit thereby to switch the relay contact cooperative to the relay and inserted in series between the motor and the first rectifying circuit and the inverse current generated by the second rectifying circuit is supplied to the motor energizing circuit for the discharging period determined by the capacity of the condenser and the discharge resistance.

A general object of the present invention is to provide a control means for the wire wrapping machine comprising a lead wire wrapping spindle and an outer fixed sleeve for rotatably supporting the spindle in which after completion of the wire wrapping operation an inverse current is supplied to a motor for the short period to allow the spindle to rotate reversely so that a slot provided in the spindle always comes to a position in alignment with a recess provided in the outer sleeve.

SUMARRY OF THE INVENTION

A principal object of the invention is to provide a control means for the wire wrapping machine comprising a lead wire wrapping spindle, an outer sleeve for turnably supporting the spindle and a dc driving motor accommodated therein and connected to an output of a rectifying circuit for converting the polarity of the current supplied to the motor on completion of the wire wrapping operation to supply an inversed voltage to the motor for the short period allowing the motor to rotate reversely so that the spindle is positioned through a ratchet means at a predetermined position in relation to the outer sleeve.

The means for supplying the inverse current to the dc motor for a short period includes a first rectifying circuit and a second rectifying circuit and the dc motor is connected to the first rectifying circuit whereas a condenser is connected in parallel to the dc motor which is shortcircuitted by breaking the conductivity with the first rectifying circuit and the condenser is discharged to actuate the relay control circuit thereby to supply the inverse current of the second circuit to the dc motor. One of the input terminals of the dc motor is connected through a motor switch to a positive output of the first rectifying circuit and a negative output of the second rectifying circuit whereas the opposite input terminal is switchably connected through a relay contact of the relay control circuit to a negative output of the first rectifying circuit and a positive output of the second rectifying circuit. Further, the relay control circuit includes a relay which is energized by the discharging current of the condenser and a relay contact cooperative with said relay is inserted in series between the dc motor and the first rectifying circuit and connected switchably to the output of the opposite porality of the second rectifying circuit.

Another objects and advantages of the invention will become clear by the following detailed description.

The invention will now be described in greater detail with reference to the accompanying drawings in which:

BRIEF DESCRIPTION OF THE DRAWINGS

FIG. 1 is a partially opened pictorial view of the wire lead wrapping spindle of the wire wrapping machine and the outer fixed sleeve for turnably receiving the spindle;

FIG. 2 is a perspective pictorial view illustrative of the lead wire being wrapped tightly at the bar terminal of the circuit element of the lead wire by the wire wrapping machine;

FIG. 3 is a front elevation of the spindle with the outer sleeve showing the position where the slot of the spindle is aligned with the recess of the sleeve;

FIG. 5 is a pictorial view of the wire wrapping machine in accordance with the present invention.

DESCRIPTION OF THE INVENTION

Figure 4:
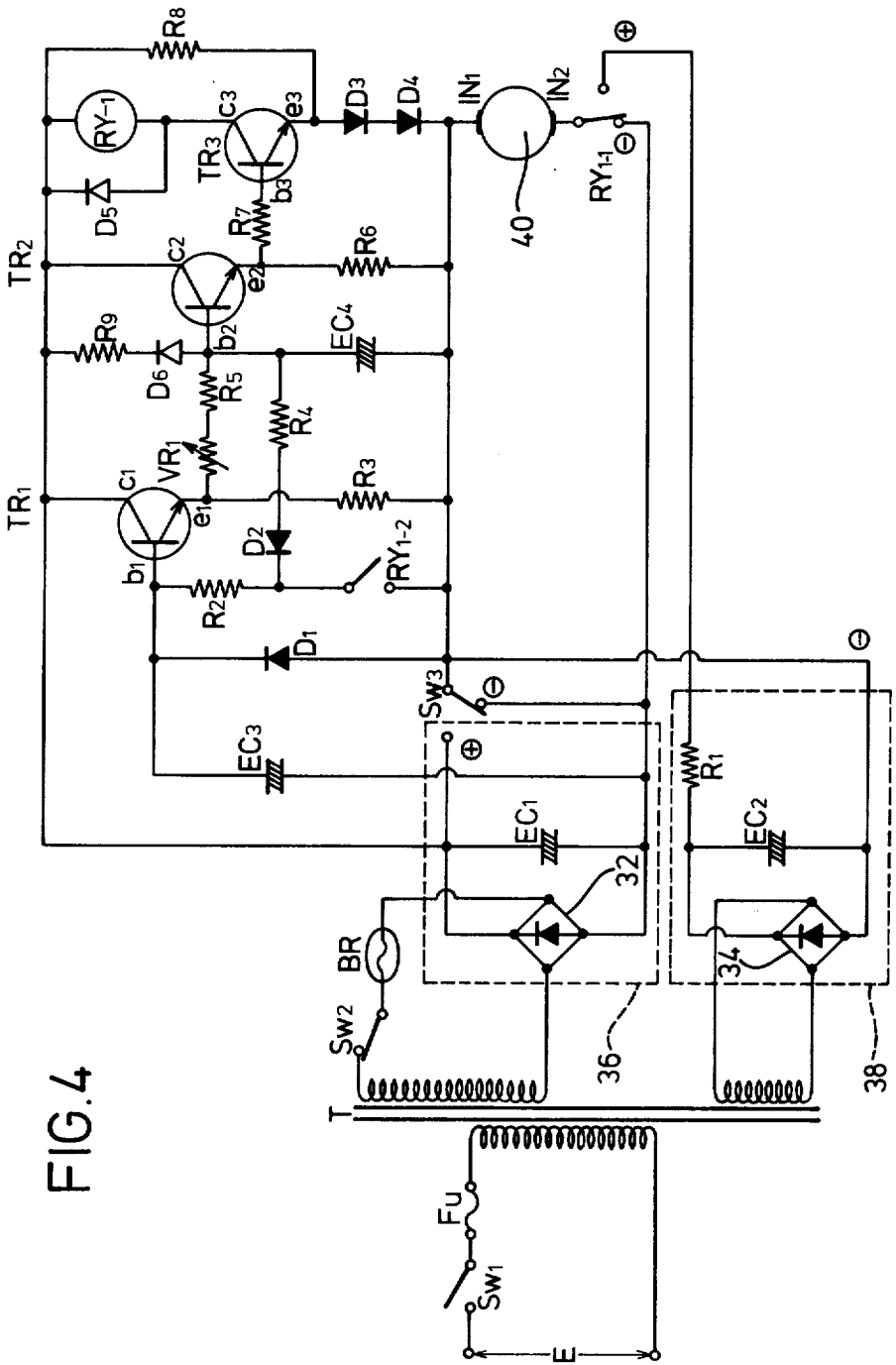
FIG. 4 is a circuit diagram of the control means of the wire wrapping machine.

In FIG. 4, the reference symbol T is a transformer for dropping the voltage of an alternate current supplied from a commercially available power source E to a desired value and to the output of the transformer T are connected a first rectifying circuit 36 and a second rectifying circuit 38 for obtaining their proper dc current through the rectifying elements 32 and 34 such as rectifying diode; selenium and the like. Reference numeral 40 represents a dc motor of small type accommodated in a wire wrapping machine 39 and one of the inputs ($IN_1$) of the motor 40 is connected to a positive output of the first rectifying circuit 36 through a negative output of the second rectifying circuit 38 and the motor switch SW3. Another input ($IN_2$) of the motor 40 is connected switchably to the negative output of the first rectifying circuit 36 and the positive output of the second rectifying circuit 38 through the relay contact $RY_{1-1}$ cooperative with the relay provided in the relay control circuit as hereinafter described. The relay contact $RY_{1-1}$ is so constructed that it is connected to the negative output of the first rectifying circuit 36 during the wire wrapping operation to rotate the motor 40 normally.

Therefore, it will be appreciated that when the motor switch SW3 is turned off and the relay contact $RY_{1-1}$ is connected to the positive output of the second rectifying circuit 38 under the operation of the relay circuit, power supply from the first rectifying circuit 36 to the motor 40 is interrupted and an inverse current is supplied from the second rectifying circuit 38 to the motor 40 to permit the motor to rotate reversely.

In the motor circuit of the first rectifying circuit 36, through a diode $D_1$ there is inserted in parallel a chargeable and dischargeable electrolytic condenser $EC_3$ of a great capacity so that a voltage of constant capacity is applied to the condenser $EC_3$ when the motor 40 rotates normally in close of the motor switch $SW_3$. The positive output of the condenser $EC_3$ is connected to a base terminal $b_1$ of the transistor $TR_1$ of the voltage amplifying circuit between an emitter terminal $e_1$ and a base terminal $b_2$ of the transistor $TR_2$ of the next stage and a variable resistor $VR_1$ and a resistor $R_5$ are connected in series. The emitter terminal $e_2$ of the transistor $TR_2$ and the base terminal $b_3$ of a transistor $TR_3$ are connected through the resistor $R_7$ and in the input ($IN_1$) side of the motor 40 there are connected the resistor $R_3$ connected with the emitter terminal $e_1$, a chargeable and dischargeable electrolytic condenser $EC_4$ connected with the base terminal $b_2$, a resistor $R_6$ connected with the emitter terminal $e_2$ and the diodes $D_3$ and $D_4$ connected in series with the emitter terminal $e_3$. The capacity of the electrolytic condenser $EC_4$ is smaller than that of the electrolytic condenser $EC_3$. The positive output of the first rectifying circuit 36 is connected to the emitter terminal $e_3$ of the transistor $TR_3$ via the resistor $R_8$ and to the positive lead the collectors $C_1$, $C_2$ of the transistors $TR_1$, $TR_2$ with the collector $C_3$ of the transistor $TR_3$ are connected through the relay $RY_1$. The relay contact $RY_{1-1}$ cooperative with the energized relay $RY_1$ is inserted into the circuit so that the input ($IN_2$) of a motor 40 can be switchably connected to the negative output of the first rectifying circuit 36 and the positive output of the second rectifying circuit 38. The relay contact $RY_{1-2}$ cooperative with the energized relay $RY_1$ is inserted as a constant open contact between the positive output of the electrolytic condenser with the base terminal $b_1$ of the transistor $TR_1$ and the input ($IN_1$) line of a motor 40 through the resistor $R_2$. The diode $D_2$ and the resistor $R_4$ are inserted in parallel between the contact of the relay contact $RY_{1-2}$ with the resistor $R_2$ and the positive output of the electrolytic condenser $EC_4$. By this arrangement, when the relay contact $RY_{1-2}$ is closed by the energization of the relay $RY_1$, the charging voltage of the electrolytic condenser $C_3$ is discharged through the resistor $R_2$ whereas the charging voltage of the electrolytic condenser $EC_4$ is discharged through the resistor $R_4$ and the diode $D_2$. The motor switch $SW_3$, when the supply of current from the first rectifying circuit 36 to the motor 40 is cut off, shortcircuits the motor circuit to electrically connect the inputs $IN_1$ and $IN_2$ of the motor 40.

As briefly illustrated in FIG. 5, the wire wrapping machine thus constructed contains a small dc motor 40 as a driving source and the rotary shaft of the motor 40 is connected to a gearing mechanism 44 with a planet wheel whereas an output shaft of the gearing mechanism is connected to the lead wire wrapping spindle 10 through a ratchet mechanism 46. The spindle 10 rotates normally and reversely in the sleeve 22, and in case of the reverse rotation the spindle 10 is held by a ratchet mechanism 46 at a position where the open end of the lead wire holding slot 16 is aligned with the recess 28 of the sleeve 22 as best shown in FIG. 3.

In operation of the control means for the wire wrapping machine according to the invention, when the bar terminal 12 of the circuit element is vertically inserted into the terminal insertion hole 14 provided in the spindle 10 to close the motor switch $SW_3$, the motor 40 is driven to allow the spindle 10 to rotate in the sleeve 22 for tightly wrapping the lead wire (see FIG. 2). During this process, the current flows through the diode $D_1$ in the regular direction to charge the electrolytic condenser $EC_3$ until the charging is saturated. When the wrapping operation process is finished and the switch $SW_3$ is opened, the current supply from the first rectifying circuit 36 to the motor 40 is interrupted to shortcircuit the motor simultaneously as the motor switch $SW_3$ is switched to directly connect the motor inputs $IN_1$ and $IN_2$, the short current is passed through the motor 40 with application of an electromagnetic brake to stop actuation of the motor instantly. By opening the motor switch $SW_3$, the discharging current of the electrolytic condenser $EC_3$ flows through the transistor $TR_1$ and the resistor $R_3$ to make the voltage of the resistor $R_3$ equal to the discharge voltage of the electrolytic condenser $EC_3$. Further, the discharge voltage charges the electrolytic condenser $EC_4$ via the variable resistor $VR_1$ and the resistor $R_5$ and is then applied to the resistors $R_6$, $R_7$ and the diodes $D_3$, $D_4$.

During this process, the voltage of the resistor $R_6$ is equal to the charging voltage of the electrolytic condenser $EC_4$ and compared to the base voltage of the transistor $TR_3$ and when the voltage of the resistor $R_6$ becomes higher than the base voltage, the transistor $TR_3$ operates as a switch to permit the collecter current of the collecter $C_3$ to pass therethrough to energize the relay $RY_1$. The relay contact $RY_{1-1}$ cooperative with the energized $RY_1$ is switched to break the connection of the input ($IN_2$) of the motor 40 to the negative output of the first rectifying circuit and instead to connect the positive output of the second rectifying circuit 38 with the input terminal ($IN_2$). In other words, the inverse voltage of the converted polarity is supplied to the motor 40 to permit the motor to rotate reversely. Since, however, the ratchet mechanism 46 is inserted into the spindle 10 connected to the motor 40 the spindle 10 is held at a predetermined position as shown in FIG. 3 to stop actuation of the motor. In this operation, the motor is constrained to stop rotation while being applied by the inverse voltage with damages of the motor by burning or demagnetization, for example. In order to avoid these defects, the relay contact $RY_1$ cooperative with the energized relay $RY_1$ is closed to discharge the condensers $EC_3$ and $EC_4$ through the resistors $R_2$ and $R_4$ until the voltage thereof comes to below the release voltage of the relay $RY_1$ so that the relay $RY_1$ is subjected to the returning operation to switch the relay contact $RY_{1-1}$ to the negative output of the first rectifying circuit 36 for discontinuing the application of the inverse voltage while reopening the relay contact $RY_{1-2}$ to obtain the constant open position. One cycle of the wire wrapping process in the control means is thus finished.

The conversion of the discharging time, i.e., an application time of the inverse voltage is optionally provided by selecting the capacitance value of the condenser $EC_4$ and the constant value of the discharging resistor $R_4$.

When the motor switch $SW_3$ is turned off to stop a further wrapping operation because of the failure of the wrapping operation during the process, since the sequence step of the control circuit is once cancelled for reset, the next wrapping operation can be repeated from the first step by the turning off of the switch. Further, by changing the resistance value of the variable resistor $VR_1$ the fine adjustment of the time in which the motor 40 after its interruption is permitted to rotate reversely by supplying the reverse current thereto may be attained.

As hereinbefore fully described, in accordance with a control means of the present invention the dc motor accommodated in the wire wrapping machine is applied by the inverse voltage for the short time to reverse the operation of the motor so that the lead wire wrapping spindle is positioned at a predetermined locus in relation to the outer fixed sleeve. Accordingly, the clutch mechanism which is indispensable to the conventional machine could be left out with reduction of the cost and decrease of the weight of the machine as well as elimination of the troubles to be caused by the clutch mechanism. Moreover, in the control means according to the invention, the motor circuit is shortcircuitted in simultaneous with the interruption of the current to the motor to instanteneously stop actuation of the motor and after the complete cessation of the motor, the inverse voltage is applied to the motor to avoid the demagnetization of the permanent magnet forming a stator of the dc motor. Further, use of the dc motor results in less noise on the wrapping operation and does not require any compressor.

While typical embodiments of the invention have been illustrated by way of example in the drawings and particularly described, it will be understood that modifications may be made in the construction and that the invention is no way limited to the embodiments shown.

What is claimed is:

1. A control system for a wire wrapping machine having a lead wire wrapping spindle supported in an outer sleeve for rotation in one direction to wrap said lead wire and in an opposite direction to reposition said spindle with respect to said sleeve, the rotation of said spindle in the opposite direction being limited by engagement with a ratchet mechanism, comprising a reversible DC motor for driving said spindle, a first rectifier circuit connected to a source of current for supplying current of a predetermined polarity, a second rectifier circuit connected to the source of current for supplying current of an opposite polarity and a switching circuit having a manual control operable to connect said first rectifier circuit to said motor for wrapping said lead wire, said switching circuit being thereafter operable independently of said manual control to connect after the elapse of a first predetermined interval said second rectifier circuit to said motor to reverse the rotation of said motor to cause said spindle to rotate into engagement with said ratchet mechanism, and on the elapse of a second predetermined interval to disconnect said second rectifier circuit from said motor independently of said ratchet mechanism.

2. The system according to claim 1 wherein the switching circuit includes a condensor connected to said first rectifier circuit for energization on passage of current from said first rectifier to said motor, means on completion of the wrapping of said wire for disconnecting said condensor from said first rectifier circuit and simultaneously forming a closed circuit for discharging said condensor, and a relay control circuit having relay actuable to connect said motor to said second rectifier circuit, said relay control circuit being energized by the discharge of said condensor to actuate after a predetermined interval said relay to connect said motor to said second circuit to thereby cause said motor to rotate reversely and after a further predetermined interval to deactivate said relay to disconnect said motor from said second rectifier circuit.

3. The system according to claim 2 wherein said means for disconnecting said condensor comprises a motor switch having a first contact connecting one input of the motor to the positive output of said first rectifier circuit and a second contact connecting the one input of the motor to the negative output of said second rectifier circuit, and said relay includes a switch having a first contact connecting the other input of the motor to the negative output of the first rectifying circuit and a second contact connecting the other input of the motor to the positive output of the second rectifier circuit, said switches being normally maintained with their first contacts connected to said motor.

4. The system according to claim 3, wherein said relay control circuit includes a first transistor, the base and emitter of which is connected to said motor switch and the one input of said motor, and the relay is connected between the collector of said first transistor and the one input of said motor, said condensor being connected between the output of said first rectifier means to the other input of said motor and to the base of said transistor, whereby on switching of said motor switch said condensor causing said first transistor to energize said relay, said relay having a normally open switch contact connected between the one input terminal of the motor and the base of said transistor, said normally open switch relay contact being closed on energization of said relay to shortcircuit said condensor causing deactuation of said first transistor and said relay disconnecting said motor from said second rectifier circuit.

5. A wire wrapping tool comprising a housing adapted to be manually held, a tubular sleeve extending from said housing and a wire wrapping spindle rotatably supported by said housing and extending through said sleeve, said housing containing the rotary control system according to claim 1.

6. The system according to claim 4, wherein the first predetermined interval is determined by a second transistor, the emitter of which is connected to said one motor input and the collector of which is connected to said relay, a second condensor connected between said emitter of first transistor and the base of the second transistor, and variable resistor means connected in parallel across said second condensor, whereby on passage of current through said first transistor said condensor is engaged during a time interval determined by said variable resistor to pass a current to the second transistor for operation of said relay.

7. The system according to claim 6, wherein said second predetermined interval is determined by interposing a resistor means in series with the normal open switch contact and said condensor, whereby on closing of said relay said condensor may be discharged during a time interval determined by said resistor means.

* * * * *